United States Patent [19]
Lechner et al.

[11] Patent Number: 5,681,915
[45] Date of Patent: Oct. 28, 1997

[54] USE OF POLYOL DERIVATIVES AS INTERNAL LUBRICANTS IN THE PRODUCTION OF MOLDED PARTS OF POLYURETHANE

[76] Inventors: Josef Lechner, Am Kellerberg 15; Karl Lechner, Kirchdorfstrasse 21, both of Feldkirchen-Westerham, Germany, D-83620

[21] Appl. No.: 534,853

[22] Filed: Sep. 27, 1995

[30] Foreign Application Priority Data

Sep. 28, 1994 [DE] Germany ............ 4434 694 8-44

[51] Int. Cl.$^6$ .................................. C08G 18/62
[52] U.S. Cl. ............ 528/74.5; 521/124; 521/164; 521/167; 528/48; 528/56; 528/71; 528/78; 554/51; 554/61; 554/105; 554/108
[58] Field of Search ................ 521/124, 164, 521/167; 528/74.5, 56, 48, 71, 78; 554/51, 61, 105, 108

[56] References Cited

U.S. PATENT DOCUMENTS 5,208,268  5/1993  Mafoti ............................. 521/115

FOREIGN PATENT DOCUMENTS

| | | |
|---|---|---|
| 1953 637 | 10/1969 | Germany . |
| 2121 670 | 5/1971 | Germany . |
| 2307 589 | 2/1973 | Germany . |
| 2435644 | 2/1975 | Germany . |
| 3143 994 | 5/1981 | Germany . |
| 3029204 | 5/1982 | Germany . |
| 3639 502 | 11/1986 | Germany . |
| 3839 334 | 11/1988 | Germany . |
| 4223 597 | 7/1992 | Germany . |

*Primary Examiner*—Rachel Gorr
*Attorney, Agent, or Firm*—Jacobson, Price, Holman & Stern, PLLC

[57] ABSTRACT

The use of polyol derivatives with at least two alcoholic hydroxy groups and at least one fatty acid residue per molecule obtainable by reacting a starting polyol with a fatty acid or a fatty acid derivative, which can be obtained by using as a starting polyol diethanolamine, triethanolamine, diisopropanolamine, triisopropanolamine, dibutanolamine, and reaction products of ethylene oxide and/or propylene oxide with ethanolamine, isopropanolamine, butanolamine, or primary or secondary, aliphatic or aromatic amines, as internal lubricants and/or polyol with internal lubricant properties in the production of molded polyurethane parts is described. In this manner a much more uniform distribution of the internal mold lubricant and thus an increase in the ductility of the reaction mixture can be achieved, and even crosslinked polyurethane profiles can be produced by extrusion.

24 Claims, No Drawings

USE OF POLYOL DERIVATIVES AS INTERNAL LUBRICANTS IN THE PRODUCTION OF MOLDED PARTS OF POLYURETHANE

This invention relates to the use of polyol derivatives with at least two alcoholic hydroxy groups and at least one fatty acid residue per molecule as internal lubricants or as a polyol with internal lubricant properties in the production of molded polyurethane parts and profiles.

Rigid, semirigid, flexible and expanded or unexpanded polyurethane materials are generally produced by injecting a mixture of polyols and polyisocyanates into a mold, where the addition reaction takes place together with the hardening and possible expansion of the reacting reaction mixture, whereby, depending on the applied pressure and formulation, foam materials with more or less dense surface layers on a foam core or even completely dense molded parts are obtained. The mold used hereby may consist of very different materials, such as steel, aluminum, or plastic, and is usually heated. The internal surface of this mold corresponds to the finished external surface of the molded polyurethane part so that, depending on surface structure and design of the molded part, complicated surfaces can be obtained.

DE-A-38 39 334 describes a process for the production of at least substantially poreless polyurethane compounds by reacting at least one polyisocyanate and at least one polyol, in which compound the polyol is a partial carboxylate of a carboxylic acid and an at least trivalent alcohol. It is stated that a release foil can be inserted between the starting materials of the polyurethane compound and the base.

It is known that in order to achieve the release effect and thus the releasability of the polyurethane product, lubricants or release varnishes can be applied to the internal mold surface. However, this creates problems because the mold lubricant is able to accumulate in the mold recesses, resulting in a detrimental effect on the surface quality of the molded part as well as additional costs for cleaning or restoring the mold. When using release varnishes which adhere to the surface of the unmolded part, this results in poor varnish qualities.

It is also known that so-called internal lubricants can be added to the reaction mixture, thus eliminating external lubricants which are applied to the internal mold surface. Such internal lubricants can be added, depending on reactivity, either to the isocyanate component or the polyol component of the reaction mixture, or to both components. These are products containing aliphatic paraffin chains, or reaction products of derivatives of long-chain fatty acids, such as hydrogenation, reduction, esterification or amidation products, salts, urethanes, or esters of such esterification or amidation products, amine salts of such fatty acids, or addition products, e.g. to carbodiimide.

DE-A-19 53 637, for example, describes a process for the production of foam materials, in which salts of aliphatic carboxylic acids and primary amines or amines with amide and/or ester groups, where said salts contain at least 25 aliphatic carbon atoms, are used as an internal lubricant. These internal lubricants are used in amounts from 0.1 to 15% by weight, preferably 0.5 to 2% by weight, related to the total reaction mixture.

Since incompatibilities do occur during the addition of such lubricants to the polyol component or polyisocyanate component of the reaction mixture, resulting in a phase separation and thus a reduced storage stability of these mixtures, DE-A 42 23 597 proposes polyol mixtures containing internal mold lubricant mixtures, said polyol mixtures containing 55 to 95% by weight of a polyol mixture consisting of a polyol with an OH value >700 and a polyol with an OH value <700, and 5 to 45% by weight of a mold lubricant mixture consisting of 60 to 95% by weight of saline lubricants, 5 to 40% by weight of lubricants with amide or urethane-NH functions without saline characteristics, and possibly other auxiliary agents. Possible saline lubricants may be salts from fatty amines, basic amine derivatives obtainable by alkoxylation of primary and/or secondary aliphatic or aromatic amines, or fatty acid esters of such alkoxylation products, whereby the salt formation takes place preferably with oleic acid or tall oil fatty acids, fish oil acids and other fatty acids which are liquid at room temperature.

The usual internal lubricants or lubricant mixtures are only designed for a release effect. This is made possible by integrating as many fatty acid chains as possible into the molecule, by using very short bonds, or by mixing substances with different structures in order to achieve a synergistic effect. Hereby no special attention is paid to the functional groups of the internal lubricant, since the latter is only an additional component after all, because even products without reactive groups, such as hydroxy groups, can be used as lubricants.

Because even these internal lubricants are unable to provide complete satisfaction, since on the one hand the release effect could be improved, the homogeneity and retention of the lubricant in the mold is unsatisfactory, and the achieved release effect is furthermore insufficient for the extrusion molding of profile parts of polyurethane, the objective of this invention is therefore to select specific polyol derivatives which are suitable as internal lubricants, or polyols with good release properties and with which a particularly good release of the molded polyurethane parts produced with them can be achieved, and whereby furthermore an improvement of surface properties of the molded parts can be achieved and it will be possible to produce molded polyurethane parts, such as polyurethane profiles, also by extrusion.

It was found that this objective can be realized in that internal lubricants are used which, due to the presence of at least two alcoholic hydroxy groups in their molecule, can be integrated into the polyurethane skeleton, and which unfold the desired release effect based on the presence of the fatty acid residue.

The above mentioned objective is thus realized by the use according to the principal claim.

The subclaims relate to preferred embodiments of this subject of the invention.

The subject of the invention is thus the use of polyol derivatives which can be obtained by reacting a starting polyol with a fatty acid or fatty acid derivative, said polyol derivatives containing at least 2 alcoholic hydroxy groups and at least one fatty acid residue per molecule, which can be obtained by using, as starting polyols, diethanolamine, triethanolamine, diisopropanolamine, triisopropanolamine, dibutanolamine, and reaction products of ethylene oxide and/or propylene oxide with ethanolamine, isopropanolamine, butanolamine, or primary or secondary, aliphatic or aromatic mines as internal lubricants and/or as a polyol with lubricant properties in the production of molded polyurethane parts.

The polyol derivatives used according to the invention thus can be used as an internal lubricant in combination with other main polyols in forming the polyurethane, or can be used as main polyol or individual polyol with release effect.

It is hereby possible that these polyol derivatives are used individually or in the form of mixtures of two or more of the defined polyol derivatives.

The polyol derivatives according to the invention contain at least two alcoholic hydroxy groups per molecule in order to ensure that no breakage occurs in the chain during the integration of these polyol derivatives into the polyurethane mixture. The polyol derivative may contain two to six alcoholic hydroxy groups per molecule, more preferably three or four alcoholic hydroxy groups per molecule, since a more extensive crosslinking of the polyurethane skeleton and thus better properties of the final product are achieved in the presence of three or more alcoholic hydroxy groups per molecule. According to a particularly preferred embodiment of the invention, the polyol derivative contains only one fatty acid residue per molecule, so that it can be used as an individual polyol or main polyol even without adversely affecting the other properties of the polyurethane product and in this way provides the product with the necessary release properties.

According to a preferred embodiment of this invention, the polyol derivative has a hydroxy value from 50 to 900, preferably 150 to 700, and even more preferably from 250 to 500.

According to a further embodiment of the invention, the used polyol derivative contains at least three primary or secondary alcoholic hydroxy groups and only one fatty acid residue per molecule. This preferred polyol derivative can be used as an individual polyol or main polyol for producing molded polyurethane pans with improved mechanical properties.

The polyol derivatives used according to the invention are obtained by reacting a starting polyol containing at least two alcoholic hydroxy groups with a fatty acid and a fatty acid derivative, such as a fatty acid anhydride or a fatty acid halide, e.g. a fatty acid chloride, by heating the reagents which have been mixed in the desired stoichiometric ratio to a temperature of 30° to 100° C., preferably 40° to 90° C., and even more preferably 60° to 80° C., whereby the reaction is preferably performed under an inert gas, such as nitrogen or argon.

The stoichiometric ratios of the starting polyol and the fatty acid or fatty acid derivative must hereby be chosen so that a polyol derivative with the desired molecule size is obtained which contains at least two, preferably at least three or four alcoholic hydroxy groups per molecule, said alcoholic hydroxy groups being required for the integration of the polyol derivative into the polyurethane skeleton, because these free alcoholic hydroxy groups react with the isocyanate groups of the polyisocyanate reagent in the same manner as the normally used polyol or the polyol used in addition to the polyol derivative which is used according to the invention, and which also contains at least one fatty acid residue per molecule which provides the necessary release properties.

The starting polyols used to form the polyol derivatives used according to the invention are nitrogen-containing compounds with at least two alcoholic hydroxy groups per molecule, such as diethanolamine, triethanolamine, diisopropanolamine, triisopropanolamine, dibutanolamine, or also reaction products of ethylene oxide and/or propylene oxide with ethanolamine, isopropanolamine, butanolamine, or primary or secondary, aliphatic or aromatic amines. The reaction products of ethylene oxide and/or propylene oxide with the primary or secondary aliphatic or aromatic amines, such as preferably ethylenediamine, N-dimethylethylenediamine, propylenediamine, N-dimethylpropylene-diamine-1,3, diethylenetriamine, or triethylenetetramine, diaminodiphenyl amine and/or toluylenediamine contain, as a result of their ethoxylation or propoxylation, at least two aliphatic hydroxy groups in the molecule. Particularly preferred reaction products of this type are tetraethanolethylenediamine and tetraisopropanolethylenediamine or tetraethoxyethylenediamine and tetraisopropoxyethylenediamine.

As a fatty acid for forming the polyol derivatives according to the invention, a natural and/or synthetic, saturated and/or unsaturated fatty acid with 8 to 20 carbon atoms is used, preferably palmitic acid, stearic acid, linoleic acid, linolenic acid, oleic acid, ricinoleic acid, arachic acid, or natural fatty acid mixtures, such as coconut oil acids, tallow fatty acids, and/or tall oil fatty acids.

Especially preferred is the use of unsaturated fatty acids, such as oleic acids, linoleic acid and/or linolenic acid, or fatty acid mixtures containing these unsaturated fatty acids, since the polyol derivatives obtained with them have a lower viscosity than the polyol derivative formed with saturated fatty acids. In addition, the polyol derivatives based on unsaturated fatty acids contain one or more double bonds which, while not involved in the addition reaction for forming the polyurethane, nevertheless oxidize later under the influence of oxygen in the air and preferably in the presence of drying agents, thus resulting under the influence of oxygen in an additional crosslinking on the surface layers of the obtained molded polyurethane parts. It is therefore particularly preferred that a drying agent, preferably a metallic soap based on cobalt, manganese, and/or lead and carboxylic acids and/or naphthenic acids, is added to the reaction mixture in order to produce the molded polyurethane part. By way of this subsequent, additional crosslinking of the molecule bond, the fatty acid of the polyol derivative used according to the invention is integrated into the molecule bond even better, and a viscous-hard compression and compaction of the surface of the molded part is obtained. This results in improved varnish application, as well as a very good varnish adhesion and bonding behavior of the molded polyurethane parts produced according to the invention. Since the tall oil fatty acids preferably used according to the invention have a high content of unsaturated and reactive fatty acid components, especially advantageous results can be obtained when using this preferred starting material and when adding drying agents or siccatives.

The polyol derivative used according to the invention is present either in the form of an ester of the used fatty acid and the used starting polyol, or, more preferably, in the form of a salt or the acid amide of the fatty acid and the starting polyol which has one amino group. During the reaction of starting polyols containing amino groups or nitrogen atoms, the reaction with the fatty acid or fatty acid derivative takes place preferably at the nitrogen atom, so that here predominantly the corresponding ammonium salt with the fatty acid or an acid amide is formed, while the free alcoholic hydroxy groups do not react with the fatty acid.

But it was unexpectedly found that these salts preferred according to the invention readily form by simply heating a mixture of the fatty acid or fatty acid derivative and the nitrogen-containing starting polyol to the above mentioned temperatures and that they will fix the fatty acid residue to a sufficient degree to the polyol derivative.

Because the polyol derivatives used according to the invention are integrated, due to the presence of at least two, preferably at least three, alcohol hydroxy groups, into the polyurethane molecule of the finally formed molded part, this results in a significantly more uniform distribution and fixation of the lubricant in the polyurethane material, so that the lubricant is unable to sweat out of the product even during longer storage under unfavorable conditions. This furthermore results in a surprisingly improved ductility of the resulting molded polyurethane part.

It was found that molded polyurethane parts obtained according to the concept of this invention can be removed from the mold smoothly and without leaving behind surface residues, and may in part even simply drop from the mold. The achieved release effect is best at mold temperatures between 40° and 60° C., since the mold release forces occurring here are zero or very low, especially if aluminum molds are used. This fact can be considered surprising because it was found that with a mold temperature of 10° to 15° C. no release effect is present and the material literally sticks to the mold wall, while at mold temperatures from 40° to 60° C. the molded part can be removed from or shaken out of the mold without further application of force.

This releasability of the molded polyurethane parts, which was clearly improved by using the defined polyol derivatives according to the invention, for the first time makes it possible to produce molded parts, such as profiles, of polyurethane molding compounds by extruding the hardening and preferably expanding polyurethane molding compound without causing problems due to adhesion of the hardening and possibly expanding polyurethane material on the surfaces of the extrusion device. The material furthermore no longer adheres to the tool surfaces during longer operating times, thus increasing the useful life of the latter, eliminates cleaning tasks, and results in products with uniform surface properties.

This unexpected improvement of the release effect can be attributed to the fact that the polyol derivative used according to the invention is integrated into the polyurethane skeleton already in a partially crosslinked state and is thus able to unfold its release effect in an early stage, so that the difficult transition from the polyurethane molding compound's liquid state to the solid state is well controlled.

According to the invention, it is possible to easily produce polyurethane foams with very low densities which are clearly below 0.1, e.g. 0.04, and still can be removed from the mold without problems. The upper density depends on the hollow content, whereby the maximum obtained density is achieved if a massive, poreless molded polyurethane part is formed.

During this production of molded parts by extrusion, the material components are mixed as usual, e.g. by low pressure mixing with a turbine or by high pressure mixing via injection, and are then further transported continuously or discontinuously through extrusion in the tool. Since the backpressure on the mixing zone must be limited for a good mixing of components, the transport from here takes place mechanically by way of reciprocating pumps, gear pumps, or propeller pumps, by injecting liquid substances with a low boiling point, e.g. $CO_2$, nitrogen, etc., or simply through the pulling-off device, if the molded part which is being produced is stable enough to absorb the pulling-off forces, e.g. during the production of rigid, very high density materials or such with a correspondingly stable reinforcement insert.

The parts extruded in this manner may, in addition to an expanded structure, also have an integral structure or may consist of unexpanded solid polyurethane material and have a crosslinked polyurethane structure. The tool used during this extrusion of molded polyurethane parts with polyol derivatives according to the invention generally consists of aluminum, is operated at a temperature from 40° to 60° C., and produces products with superior surface properties. This result can be considered surprising, since even with knowledge of the above mentioned state of the art it could not be expected that by using the lubricant in the molecule of the molded polyurethane part it would become possible that, even by extrusion, molded parts with superior surface properties could be produced without problems and with surprisingly high useful lives of the used tools.

When using the discussed polyol derivatives according to the invention, the molded polyurethane parts are produced by normal mixing of a polyol with the polyisocyanate and possibly standard auxiliary agents and additives. The polyol derivative used according to the invention can hereby be used alone or in the form of a mixture with a standard polyether polyol and/or polyester polyol, whereby the amount of the polyol derivative used according to the invention must be such that the desired release effect is achieved.

The mass ratios of polyol component to polyisocyanate component are generally stoichiometric, whereby the polyisocyanate is preferably used with an excess of 5 to 10% in order to ensure a complete reaction of the present polyol and thus the desired properties of the final polyurethane product, because in this way any possibly still present excess polyisocyanate reacts with itself until it is finished. It is naturally also possible by using the polyisocyanate with a higher excess of 10 to 40% and by using a trimerization catalyst, such as an amine, phosphine, an alcoholate, or quaternary ammonium carboxylate, not only to form polyurethane components in the final product, but to also form polyisocyanurate components in order to adjust the properties of the molded parts as desired in this manner.

The molded polyurethane parts may consist, as was already mentioned, of polyurethane foam, polyurethane integral foam, or solid polyurethane depending on the additives which were used.

In order to form the molded polyurethane part, standard polyols, e.g. polyether polyols and/or polyester polyols, in particular polyol mixtures of polyols with molecular weights from 500 to 10,000, more preferably from 800 to 5,000, are used in addition to the polyol derivative used according to the invention.

Other additives and auxiliary agents employed in addition to the polyol and/or the polyol derivative used according to the invention and the polyisocyanate consist of catalysts for activating the polyaddition, such as tertiary amines, triethylenediamine, tin dioctoate, or tin dibutyl laurate, chain extension agents, such as butane diols, foam stabilizers, such as polysiloxane/polyoxyalkylene block polymers, expansion agents, such as e.g. $CHF_2Cl$, propane, cyclopentane, or water, as well as the activators for the oxidative crosslinking of the fatty acid double bonds, i.e. drying agents or siccatives already mentioned above.

As polyisocyanates, the usual materials are used, such as tetramethylene diisocyanate, hexamethylene diisocyanate, N-xylylene diisocyanate, p-xylylene diisocyanate, 4,4'-dimethyl-1,3-xylylene diisocyanate, cyclohexane-1,4-diisocyanate, cyclohexylmethane-4,4'-diisocyanate, N-phenylene diisocyanate, p-phenylene diisocyanate, a-alkylbenzene-2,4- and -2,6-diisocyanate, ditolylene-2,4- and -2,6-diisocyanate, 3-($\alpha$-isocyanatoethyl)-phenylisocyanate, 1-benzylbenzene-2,6-diisocyanate, 2,6-diethyl-benzene-1,4-diisocyanate, diphenyhnethane-4,4'-diisocyanate, 3,3'-dimethoxydiphenylmethane-4,4'-diisocyanate, naphthylene-1,5-diisocyanate, or also tri- and multifunctional polyisocyanates; but preferably 4,4'-methylenedi-(phenylisocyanate) (MDI) is used.

Other additives known to the expert are emulsifiers, cell regulators, flame retardants, fillers, coloring agents, and/or reaction retarders.

These additives are generally added to the polyol component. In addition to the added drying agents, the polyol derivatives used according to the invention and the mentioned additives can also be components of normal formulations for producing molded polyurethane parts.

It was hereby found to be particularly advantageous if the polyol derivatives used according to the invention, as a result of the presence of at least two and more preferably three alcoholic hydroxy groups, do not separate from the other components of the polyol or form a separate phase, so that a segregation is not possible, thus resulting in a particularly good storage stability of the products used according to the invention as internal lubricants in combination with the polyols. By integrating the polyol derivatives used according to the invention into the polyurethane molecule, a possible sweating out of the lubricant is completely prevented, something which is not possible in standard internal lubricants which, due to their different properties and their lower molecular weight, are less able to stay in the compound and will migrate to the surface of the molded parts over time.

An important advantage of the concept of the invention is that no lubricant accumulates in tools used for producing the molded polyurethane parts, such as component pumps, mixing heads, molds, and extrusion nozzles, so that these tools need not be cleaned even after a longer continuous operation and are hardly subject to any wear. Another advantage is that by the presence of the fatty acid in the polyol derivatives used according to the invention and by its integration into the polyurethane molecule the hydrolysis resistance of the latter is increased. The presence of the fatty acid residue in the polyol derivatives used according to the invention furthermore enhances the emulsifying properties of the material and thus the compatibility of this component with the other components of the polyurethane reaction mixture, and thus the formation and stabilization of the foam which may be produced. Due to the simple production of the polyol derivatives used according to the invention, the processor is also able to at least partially determine and adjust the properties of the polyol component and thus the properties of the polyurethane by properly adapting the number of hydroxy groups and fatty acid residues.

The following examples are meant to further explain the invention.

PRODUCTION EXAMPLE 1

Polyol derivative on amine basis

The reaction product is formed from one mol ethylenediamine and 4 mols propylene oxide, thus resulting in an intermediary product with the following formula:

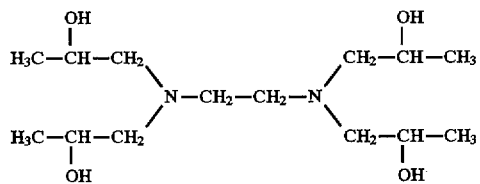

and having a molecular weight of 292. This material has four alcoholic hydroxy groups and a hydroxy value of 768.

This intermediary product is reacted by heating it to 60° to 80° C. with one mol tall oil fatty acids. The molecular weight is hereby increased to approximately 570; the hydroxy value is decreased to approximately 400.

PRODUCTION EXAMPLE 2

Polyol derivative on alkanolamine basis

One tool of standard commercially available triisopropanolamine (molecular weight=191; hydroxy value=880 with three alcoholic hydroxy groups) is reacted with one mole tall oil distillate (fatty acid/resinoic acid=80/20) by heating. This yields the compound with the following formula:

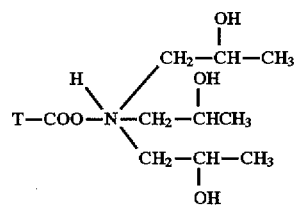

wherein T stands for the residue of the tall oil fatty acids and X for an anion. The polyol derivative has a molecular weight of approximately 470 and a hydroxy value of approximately 360.

Even though the melting point of the triisopropanolamine is 59° C., the reaction with the tall oil fatty acids results, due to the present double bonds, in a viscosity of the polyol derivative which is advantageous for processing.

PRODUCTION EXAMPLE 3

Polyol derivative on triethanolamine basis

The starting polyol used is a propoxylated triethanolamine with a hydroxy value of 450 and three alcoholic hydroxy groups. One mol of this starting polyol is reacted with one mol tall oil fatty acid distillate by heating for one hour to 60° to 80° C. This yields a polyol derivative with a molecular weight of approximately 660 and a hydroxy value of approximately 250.

The parts stated in the following examples are related to weight.

Example 1

A molded polyurethane part is formed by using the following components A and B:

| Component A: | | |
|---|---|---|
| 40 parts | polyol according to Production Example 1 hydroxy value 400 mg KOH/g | |
| 40 parts | polyol according to Production Example 2 hydroxy value 360 mg KOH/g | |
| 10 parts | butanediol 1,4, hydroxy value 1,200 mg KOH/g | |
| 3.5 parts | polyether polyol produced by addition of 87% propylene oxide and 17% ethylene oxide to trimethylol propane. Hydroxy value 36 mg KOH/g | |
| 0.4 parts | water | |
| 5 parts | expanding agent R22 (CHClF$_2$) | |
| 0.3 parts | triethylenediamine, 33% in dipropylene glycol Dabco 33 LV of the Houdry-Hüls company (= 1,4-diaza-bicyclo[2,2,2]octane) | |
| 0.8 parts | silicone stabilizer (polysiloxane/polyoxyalkylene/block polymers of the Goldschmidt company, e.g. B 2219) | |
| Component B: | | |
| 120 parts | polyisocyanate MDI, 4,4-diphenyl-methane-diisocyanate with an NCO content of 28% to 30%. Viscosity (25° C.) approximately 200 mPa · s | |

100 parts of component A and 120 parts of component B (which is used in a 5% stoichiometric excess above the polyol amount used in component A) are intensively mixed at a temperature of 20° to 25° C. with a two-component high-pressure metering mixer and filled into a closed aluminum mold. At a tool temperature of approximately 50° to 60° C., the mixture reacts after a starting time of approximately 3 seconds, fills out the mold cavity, and hardens. The mold is opened after 3 minutes, and the expanded molded part is removed from the mold. During removal of the molded part, no removal force of any type is necessary, and the tool halves are easy to open. Even with repeated production of the molded parts in this manner, the molded part can be easily removed without any restoring or cleaning of the mold. The molded part can be further processed, if needed, after cooling.

Example 2

A molded polyurethane part is formed by using the following components A and B:

Component A:

| | | |
|---|---|---|
| 25 parts | polyol according to Production Example 1 hydroxy value 400 mg KOH/g | |
| 20 parts | polyol according to Production Example 2 hydroxy value 360 mg KOH/g | |
| 5 parts | polyol according to Production Example 3 hydroxy value 250 mg KOH/g | |
| 30 parts | standard commercially available polyether polyol on amine basis. Functionality = 4.5, hydroxy value 450 mg KOH/g | |
| 5.5 parts | standard commercially available polyether polyol, produced by addition of 87% propylene oxide and 17% ethylene oxide to trimethylol propane. Functionality = 3; hydroxy value 36 mg KOH/g | |
| 2 parts | water | |
| 10 parts | expanding agent R22 ($CHClF_2$) | |
| 0.2 parts | triethylenediamine, 33% in dipropylene glycol Dabco 33 LV of the Houdry-Hüls company (= 1,4-diazabicyclo[2,2,2]octane) | |
| 1 part | dimethylcyclohexyl amine | |
| 0.1 part | dibutyl tin dilaurate | |
| 1.2 parts | silicone stabilizer (polysiloxane/polyoxyalkylene/block polymers of the Goldschmidt company, e.g. B 2219) | |

Component B:

| | | |
|---|---|---|
| 125 parts | polyisocyanate MDI, 4,4-diphenyl-methane-diisocyanate, commercially available, NCO content (25° C.) 30.7. Viscosity 230 mPa · s; functionality 2.7 | |

100 pans of component A and 125 parts of component B (corresponding to a 10% stoichiometric excess compared to the polyol) are intensively mixed at a temperature of 20° to 25° C. with a two-component high-pressure meteroing mixer and the mixture is filled into an aluminum mold. After a resting time of 5 seconds the mixture reacts and fills the mold cavity at a tool temperature of 55° C. The mold is opened after 5 minutes and the expanded molded part is removed. The bulk density, freely expanded, is 40 g/dm³.

The tool is filled with three different amounts of material. During the first test, material is added to the mold so that the mold is just filled during expansion, and a hardened product with a bulk density of 40 to 50 g/dm³ is obtained (which corresponds almost to the freely expanded bulk density).

During the second test, the mold is filled with a compression degree of two (double amount of starting material), so that the finished expanded molded part has a density of 0.08. The third test is performed with a compression degree of 4, thus corresponding to a bulk density of the molded part of approximately 160 g/dm³.

The tool can be easily opened by hand during all three tests, and the molded parts can be just as easily removed from the mold without residue. In all tests, especially during Test 1 in which a molded part with a very low bulk density of 40 g/dm³ is produced, no material residues remain behind in the mold, even with repeated production. Only in Test 1 is the surface of the molded part (expansion skin) not particularly firm, which can be attributed to the low density and minimal expansion pressure during the expansion process. With an increasing degree of compression, the expansion skin becomes thicker and more stable. After cooling, the molded parts can be further processed and vanished without additional processing of the surface of the expanded part.

What is claimed is:

1. A polyol derivative useful as an internal lubricant in the production of molded polyurethane parts containing 3 to 6 alcoholic hydroxy groups and at least one fatty acid residue per molecule obtained by the process comprising reacting (a) a starting polyol selected from the group consisting of diethanolamine, triethanolamine, diisopropanolamine, triisopropanolamine, dibutanyloamine, and a reaction product of
   (i) ethylene oxide, propylene oxide, or a combination of ethylene oxide and propylene oxide; and
   (ii) ethanolamine, isopropanolamine, butanolamine, or a primary or secondary aliphatic or aromatic amine,
with (b) a natural and/or synthetic, saturated and/or unsaturated fatty acid or fatty acid derivative.

2. The polyol derivative of claim 1 characterized in that the polyol derivative has 3 or 4 primary and/or secondary alcoholic hydroxyl groups and only one fatty acid residue per molecule.

3. The polyol derivative of claim 1 characterized in that the polyol derivative has a hydroxy value selected from the group consisting from 50 to 900.

4. The polyol derivative of claim 1 characterized in that the polyol derivative has a hydroxy value from 150 to 700.

5. The polyol derivative of claim 1 characterized in that the polyol derivative has a hydroxy value from 250 to 500.

6. The polyol derivative of claim 1 characterized in that the starting polyol contains N-dimethylethylene adiamine, propylene diamine, N-dimethylpropylenediamine-1,3-diethylenetriamine, triethylenetetramine, diaminodiphenylamine, and/or toluylenediamine as a primary or secondary aliphatic or aromatic amine.

7. The polyol derivative of claim 1 characterized in that the starting polyol contains the reaction product of (i) ethylene oxide and/or propylene oxide with (ii) tetraethanolethylene diamine and tetraisopropanolethylene diamine, or tetraethoxyethylene diamine and tetraisopropoxyethylene diamine.

8. The polyol derivative of claim 1 characterized in that the fatty acid has 8 to 20 carbon atoms.

9. The polyol derivative of claim 1 characterized in that the starting polyol is reacted with the fatty acid at a temperature of 30° to 100° C.

10. The polyol derivative of claim 1 characterized in that the starting polyol is reacted with the fatty acid at a temperature of 40° to 90° C.

11. The polyol derivative of claim 1 characterized in that the starting polyol is reacted with the fatty acid at a temperature of 60° to 80° C.

12. The polyol derivative of claim 1 characterized in that the fatty acid is palmitic acid, stearic acid, linoleic acid, linolenic acid, oleic acid, ricinoleic acid, arachic acid, coconut oil fatty acids, tallow fatty acids, and/or tall oil fatty acids.

13. The polyol derivative of claim 1 characterized in that the fatty acid is an unsaturated fatty acid.

14. The polyol derivative of claim 13 characterized in that the unsaturated fatty acid is oleic acid, linoleic acid, and/or linolenic acid.

15. The polyol derivative of claim 1 characterized in that the polyol derivative is an ester of the fatty acid and the starting polyol or a salt or acid amide of the fatty acid and the starting polyol which has one amino group.

16. In a molded polyurethane part produced from a reaction mixture, the improvement wherein the reaction mixture contains the polyol derivative of claim 1.

17. The molded polyurethane part of claim 16 characterized in that the reaction mixture further contains, as standard components in the production of the molded polyurethane part, a polyether polyol and/or polyester polyol, a polyisocyanate, and auxiliary agents and additives.

18. The molded polyurethane part of claim 16 characterized in that the reaction mixture further contains a metallic soap as a drying agent.

19. The molded polyurethane part of claim 18 characterized in that (i) the metal of the metallic soap is cobalt, manganese, and/or lead, and (ii) the soap is a carboxylic acid and/or naphthenic acid soap.

20. The molded polyurethane part of claim 16 as a polyurethane foam.

21. The molded polyurethane part of claim 17 as a polyurethane foam.

22. The molded polyurethane part of claim 19 as a polyurethane foam.

23. The molded polyurethane part of claim 16 characterized in that the reaction mixture contains two or more of the polyol derivatives.

24. In a method of producing a polyurethane molded part comprising extrusion hardening and, optionally, expanding a polyurethane molding compound, the improvement wherein the polyurethane molding compound contains the polyol derivative of claim 1.

* * * * *